No. 893,943. PATENTED JULY 21, 1908.
J. H. SELLMAN.
EEL TRAP.
APPLICATION FILED NOV. 27, 1907.
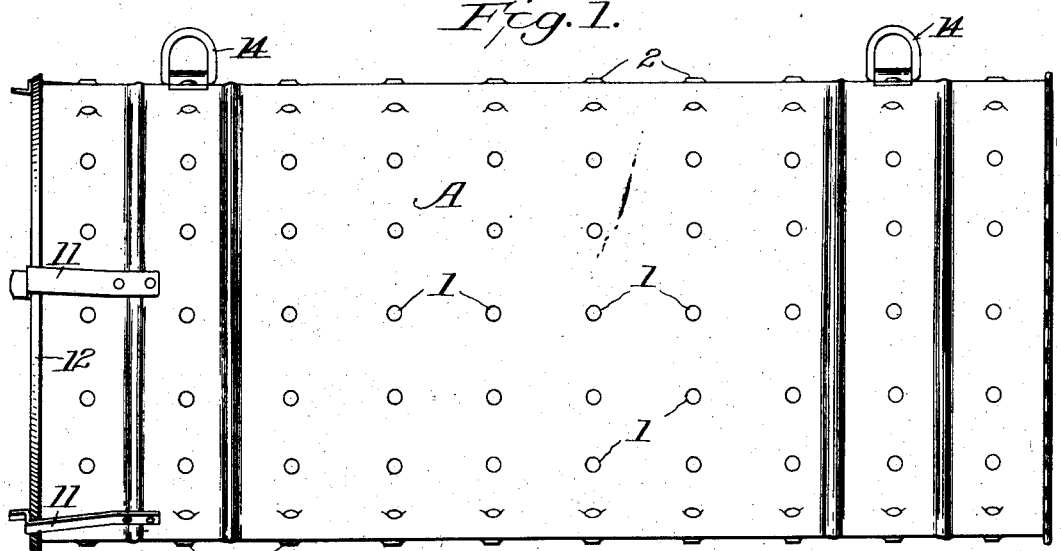
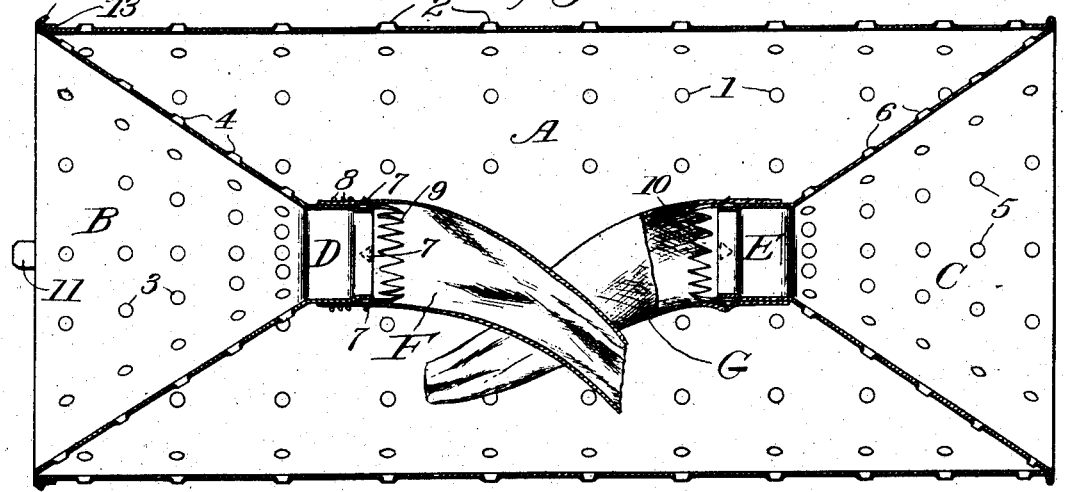
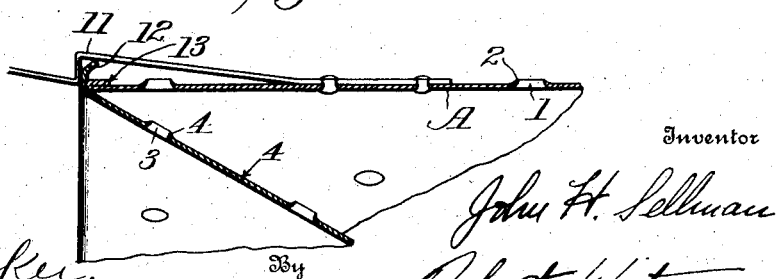
Witnesses
Inventor
John H. Sellman
By Robert Watson
Attorney

UNITED STATES PATENT OFFICE.

JOHN H. SELLMAN, OF BALTIMORE, MARYLAND.

EEL-TRAP.

No. 893,943.  Specification of Letters Patent.  Patented July 21, 1908.

Application filed November 27, 1907. Serial No. 404,163.

*To all whom it may concern:*

Be it known that I, JOHN H. SELLMAN, a citizen of the United States, residing at Baltimore, in the State of Maryland, have invented certain new and useful Improvements in Eel-Traps, of which the following is a specification.

This invention relates to traps for eels or similar animals.

One object of the invention is to provide a device of the character indicated which shall securely retain any eels or like animals, that have entered it, until such time as they may be liberated by the trapper.

Another object of the invention is to provide a trap so constructed as to prevent the abstracting from the outside of bait placed within the trap.

A further object of the invention is to provide a trap which shall facilitate the luring of the eels to and through an ingress opening.

Ancillary objects will appear hereinafter.

In the accompanying drawing, which illustrates my invention, Figure 1 is a side elevation of an eel trap; Fig. 2 is a central longitudinal section of the same, and Fig. 3 is an enlarged section of the trap taken in a central longitudinal plane, showing a portion of the body of the trap, a portion of a removable head and a catch for securing the head and body together, this view serving to illustrate the relations of the parts referred to.

Referring to the drawings, the trap therein shown comprises a body portion A and heads B and C, the body and heads forming the inclosing walls of a chamber within which the eels are entrapped. The trap as shown is provided with two ingress openings, D and E. About the ingress opening D is secured one end of a flexible sleeve F, the other end of the sleeve being free, and in a similar manner one end of the flexible sleeve G is secured about the opening E.

In the body are perforations 1. These perforations may be formed by punching when the sheet is flat and before it is formed into the trap body. The punching of the sheet results in the formation of burs 2 about the perforations and in forming the body the metal is so disposed that these burs are upon the exterior of the trap.

The heads B and C are preferably funnel shaped as shown so as to guide the eel to the ingress opening D or E as the case may be. Each of the heads is preferably formed of sheet metal having perforations punched therein in a manner similar to that described in connection with the body of the trap. In forming these heads the metal is so disposed that the burs about the perforations are upon the inside thereof, that is the burs are on the interior of the trap when it is assembled, thus about the perforations 3 of the head B are the burs 4 upon the inside of that head, and similarly about the perforations 5 of the head C are the burs 6 which are upon the inside of the latter head.

The flexible sleeves F and G are respectively secured about the ingress openings D and E which are respectively located at the apices of the funnel shaped heads B and C. These flexible sleeves may be of canvas or other suitable material. The sleeve F is secured to the head by means of prongs 7 struck up from the metal of the head and engaging with the sleeve and a wire 8 which securely binds the end of the sleeve against the head and into engagement with the prongs 7. About the opening B are prongs 9 which project toward the interior of the trap chamber and toward the center of the ingress opening. In the drawing the prongs 9 and 7 are shown as formed on a piece separate from the head B. This piece is, however, soldered to that head and so virtually forms a part thereof. In a similar manner the flexible sleeve G is secured to the head C and prongs 10 are provided about the opening E, which prongs are similar to the prongs 9 about the opening D.

To afford access to the interior of the trap to place bait therein, remove eels therefrom or for other reasons, one or more of the heads may be made removable. Ordinarily it is sufficient if one head is made removable. In the drawing the head B is illustrated as the removable one and spring catches 11 are provided for securing this head in position against the trap body. It is to be observed that the rim 12 of the head B overlaps the edge 13 of the trap body. This has the effect of securing the head against the trap body so as to prevent any material opening therebetween even though one or more of the spring catches should be disengaged, which might occur by reason of the contact of the trap with the bed of a body of water within which it is placed, or by reason of contact with other things.

The body of the trap may be provided with links or rings 14 to which a rope or chain may be secured for raising or lowering the trap.

In using the trap as shown in the drawings, the head B is removed and bait placed within the interior of the trap body. The head is then replaced and secured by the catches 11 and the trap is lowered into a position where it is liable to be found by eels. It has been found that in traps constructed with wire and which are not provided with means to prevent it, the eel is apt to abstract the bait from the interior of the trap through the perforations or openings in its walls and consequently will not enter the trap. With the trap just described, however, if an eel is attracted by the bait and attempts to abstract it through the perforations, he comes against the sharp burs hereinbefore referred to and quickly abandons his efforts in this direction and seeks for other means of access. Of course, the function of the burs could be accomplished by other sharp or pointed projections about the perforations and which might be formed in ways other than that described. The consideration just referred to is an important one for eels seem to have a peculiar adeptness in abstracting bait in the manner described, and fishermen often find their traps denuded of bait and no eels in them. Upon entering the funnel B or C the eel is not met by any of the sharp projections as are found upon the exterior of the body of the trap and, not being thus repelled, he is guided to the opening D or E and into the flexible sleeve secured thereabout. After having passed beyond the prongs 7 or 10 as the case may be, an attempt, on his part, to back out will result in his being pricked by said projections, when he will again start forward, usually with high speed and, traversing the sleeve, will arrive within the trap chamber. After the passing of the eel, the sleeve collapses and the chances of an eel finding the free end of the sleeve and then traversing the sleeve to the outside of the trap are so small as to be negligible. It will thus be seen that the sleeve is a reliable means for preventing egress from the trap while it readily permits ingress thereto.

While the invention has, in accordance with the patent statutes, been illustrated in what is considered its best application, it may be embodied in other structures without departing from its spirit. It is not therefore limited to the structure shown.

What I claim is,—

1. In an eel trap, the combination with the inclosing walls of a chamber having an ingress opening, of a flexible sleeve secured at one end about said opening, the other end of said sleeve being free, and prongs about said opening, said prongs projecting toward the interior of said chamber and toward the center of said opening.

2. In an eel trap, the combination with a body, of a funnel shaped head secured thereto, having an opening at its apex, and a flexible sleeve secured at one end about said opening, the other end of said sleeve being free.

3. In an eel trap, the combination of a perforated body having sharp projections upon its exterior, and means for permitting ingress to but preventing egress from the interior of said body.

4. In an eel trap, the combination of a body of sheet metal having perforations punched therein, the burs about said perforations being upon the exterior of said body, and means for permitting ingress to but preventing egress from said body.

5. In an eel trap, the combination of a body of sheet metal having perforations punched therein, the burs about said perforations being upon the exterior of said body, and a funnel shaped head having an ingress opening at its apex, said head being of sheet metal having punched perforations, the burs about the perforations in said head being upon the interior thereof.

In testimony whereof I affix my signature, in presence of two witnesses.

JOHN H. SELLMAN.

Witnesses:
   ALMA L. CARR,
   FRANCIS E. PEGRAM.